(12) United States Patent
Liu et al.

(10) Patent No.: US 10,048,783 B2
(45) Date of Patent: Aug. 14, 2018

(54) TOUCH PANEL DEVICE

(75) Inventors: Chen-Yu Liu, Taoyuan County (TW); Lu-Hsing Lee, Taoyuan County (TW)

(73) Assignee: TPK Touch Solutions Inc., Taipei (TW)

( * ) Notice: Subject to any disclaimer, the term of this patent is extended or adjusted under 35 U.S.C. 154(b) by 0 days.

(21) Appl. No.: 13/031,911

(22) Filed: Feb. 22, 2011

(65) Prior Publication Data

US 2012/0113021 A1 May 10, 2012
US 2015/0054750 A9 Feb. 26, 2015

Related U.S. Application Data

(63) Continuation of application No. PCT/CN2010/078548, filed on Nov. 9, 2010.

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01); *G06F 2203/04111* (2013.01)

(58) Field of Classification Search
CPC ........................................................ G06F 3/045
USPC ........................................................ 345/173
See application file for complete search history.

(56) References Cited

U.S. PATENT DOCUMENTS

| | | | |
|---|---|---|---|
| 3,736,047 A | 5/1973 | Kang et al. | |
| 6,137,427 A | 10/2000 | Binstead | |
| 6,188,391 B1 | 2/2001 | Seely et al. | |
| 6,814,452 B2 | 11/2004 | Kusuda | |
| 6,819,316 B2 | 11/2004 | Schulz et al. | |
| 7,339,579 B2 | 3/2008 | Richter et al. | |
| 7,439,962 B2 | 10/2008 | Reynolds | |
| 2004/0141110 A1 | 7/2004 | Yu et al. | |
| 2004/0160424 A1 | 8/2004 | Bottari et al. | |
| 2005/0073507 A1 | 4/2005 | Richter et al. | |
| 2006/0097991 A1 | 5/2006 | Hotelling et al. | |
| 2006/0272850 A1 | 12/2006 | Morimoto et al. | |
| 2006/0274055 A1 | 12/2006 | Reynolds et al. | |
| 2007/0165004 A1 | 7/2007 | Seelhammer et al. | |
| 2007/0236618 A1 | 10/2007 | Maag et al. | |

(Continued)

FOREIGN PATENT DOCUMENTS

| | | |
|---|---|---|
| CN | 1818842 A | 8/2006 |
| CN | 1867882 A | 11/2006 |

(Continued)

OTHER PUBLICATIONS

International Search Report, PCT/CN2010/078548, dated Aug. 11, 2011 (4 pps).

*Primary Examiner* — Claire X Pappas
*Assistant Examiner* — Benjamin Casarez
(74) *Attorney, Agent, or Firm* — Cooper Legal Group, LLC

(57) ABSTRACT

A touch panel stackup comprises a substrate, a first conductive element having a first refractive index and forming a plurality of patterns with on or more gaps on the substrate having an address for sensing tactile signals in a first direction and a second direction, a second conductive element having a second refractive index coupled with said plurality of patterns an insulator disposed among said one or more gaps, the second refractive index being substantially the same as said first refractive index.

22 Claims, 9 Drawing Sheets

(56) References Cited

U.S. PATENT DOCUMENTS

| | | | |
|---|---|---|---|
| 2007/0271399 A1 | 11/2007 | Peng et al. | |
| 2008/0136791 A1 | 6/2008 | Nissar | |
| 2008/0142352 A1 | 7/2008 | Wright | |
| 2008/0165158 A1 | 7/2008 | Hotelling et al. | |
| 2008/0264699 A1* | 10/2008 | Chang | G06F 3/044 178/18.01 |
| 2008/0277259 A1 | 11/2008 | Chang | |
| 2008/0308323 A1 | 12/2008 | Huang et al. | |
| 2008/0309635 A1 | 12/2008 | Matsuo | |
| 2009/0091546 A1 | 4/2009 | Joo et al. | |
| 2009/0102814 A1 | 4/2009 | Lin et al. | |
| 2009/0146967 A1 | 6/2009 | Ino et al. | |
| 2009/0160824 A1 | 6/2009 | Chih-Yung et al. | |
| 2009/0184937 A1* | 7/2009 | Grivna | G06F 3/0412 345/173 |
| 2009/0188726 A1 | 7/2009 | Chang et al. | |
| 2009/0207151 A1 | 8/2009 | Liu et al. | |
| 2009/0236151 A1* | 9/2009 | Yeh | G06F 3/0412 178/18.03 |
| 2009/0244028 A1* | 10/2009 | Matsuo | G06F 3/044 345/174 |
| 2009/0262096 A1* | 10/2009 | Teramoto | G06F 3/0412 345/174 |
| 2009/0278815 A1 | 11/2009 | Li et al. | |
| 2010/0128000 A1* | 5/2010 | Lo | G06F 3/044 345/174 |
| 2010/0141608 A1* | 6/2010 | Huang et al. | 345/178 |
| 2010/0164900 A1* | 7/2010 | Lin | 345/174 |
| 2010/0182250 A1* | 7/2010 | Kang et al. | 345/173 |
| 2010/0182256 A1* | 7/2010 | Jeong | G06F 3/044 345/173 |
| 2010/0220076 A1* | 9/2010 | Nagata | G06F 3/044 345/174 |
| 2010/0231542 A1* | 9/2010 | Momose | G06F 3/044 345/173 |
| 2010/0231543 A1 | 9/2010 | Momose | |
| 2010/0233930 A1* | 9/2010 | Ishida | G06F 3/0412 445/24 |
| 2010/0238133 A1* | 9/2010 | Wu | G06F 3/044 345/174 |
| 2010/0245285 A1* | 9/2010 | Wang | G06F 3/044 345/174 |
| 2010/0265187 A1 | 10/2010 | Chang et al. | |
| 2010/0302206 A1* | 12/2010 | Yu | G06F 3/041 345/174 |
| 2010/0321327 A1 | 12/2010 | Liu | |
| 2011/0012841 A1* | 1/2011 | Lin | G06F 3/041 345/173 |
| 2011/0018560 A1* | 1/2011 | Kurashima | G06F 3/044 324/679 |
| 2011/0063782 A1* | 3/2011 | Hirai | G06F 3/044 361/679.01 |
| 2011/0096025 A1* | 4/2011 | Slobodin et al. | 345/174 |
| 2011/0134050 A1 | 6/2011 | Harley | |
| 2011/0193793 A1* | 8/2011 | An | G06F 3/044 345/173 |
| 2011/0233051 A1* | 9/2011 | Fan | G06F 3/044 204/192.17 |
| 2011/0234511 A1* | 9/2011 | Jeong | G06F 3/044 345/173 |
| 2012/0113014 A1* | 5/2012 | Yilmaz | 345/173 |
| 2012/0113042 A1* | 5/2012 | Bayramoglu et al. | 345/174 |
| 2012/0127387 A1* | 5/2012 | Yamato | G06F 3/044 349/42 |
| 2013/0215082 A1* | 8/2013 | Mi | G06F 3/044 345/174 |

FOREIGN PATENT DOCUMENTS

| | | |
|---|---|---|
| CN | 201078769 Y | 6/2008 |
| CN | 201078769 Y | 6/2008 |
| CN | 101458601 A | 6/2009 |
| CN | 101504496 A | 8/2009 |
| CN | 101776967 | 7/2010 |
| CN | 101776967 A | 7/2010 |
| CN | 101866250 | 10/2010 |
| CN | 101866250 A | 10/2010 |
| CN | 202230457 | 5/2012 |
| CN | 202230457 U | 5/2012 |
| JP | H06161449 A | 6/1994 |
| JP | 2007533044 A | 11/2007 |
| JP | 2008077201 A | 4/2008 |
| JP | 2008310550 A | 12/2008 |
| JP | 2010002958 A | 1/2010 |
| JP | 2010044492 A | 2/2010 |
| JP | 2010061425 A | 3/2010 |
| JP | 2010146283 A | 7/2010 |
| JP | 2010146785 A | 7/2010 |
| JP | 2010160670 A | 7/2010 |
| JP | 2010165332 A | 7/2010 |
| JP | 2010140370 A | 8/2010 |
| JP | 2010182027 A | 8/2010 |
| KR | 20090101292 A | 9/2009 |
| KR | 100942763 B1 | 2/2010 |
| KR | 100988654 | 10/2010 |
| TW | M387317 U1 | 8/1999 |
| TW | 200742610 A | 11/2007 |
| TW | 200742610 A | 11/2007 |
| TW | 200951789 | 12/2009 |
| TW | 200951789 A | 12/2009 |
| TW | M387317 A | 8/2010 |
| WO | 0073984 A1 | 12/2000 |

* cited by examiner

TOUCH PANEL DEVICE

CROSS-REFERENCE TO RELATED APPLICATIONS

This application is a continuation of International Patent Application No. PCT/CN2010/078548, filed on Nov. 9, 2010.

BACKGROUND OF THE INVENTION

1. Field of the Invention

The present invention relates to a touch panel device. More specifically, the invention relates to the index matching touch panel device.

2. Description of Related Art

Touch panels are popular input devices. When the user touches a certain position on the touch panel, corresponding to the text or the images on the underneath display device, the touch panel senses the tactile signals and transmits them to a controller for further signal processing. The controller processes the tactile signals and outputs signals corresponding to the touched position. There are several types of touch panels, for example, resistive types, capacitive types, infrared types, surface acoustic wave types, etc. For instance, the capacitive touch panels detect the difference of capacitance of the touch panel. When the user touches the touch panel, the capacitor on the corresponding position is changed. The controller detects and calculates the difference of the capacitance and then outputs corresponding signals.

The conventional touch panel includes one or more layers of sensing electrodes, conductive circuits, masking elements, a supporting substrate, and a protective lens substrate providing anti-scratch, anti-glare, and/or anti-reflective function. The sensing layer, composed of transparent conductive material forming a plurality of pre-determined geometrical patterns, could sense the tactile signal. Suitable insulators are placed among those sensing electrodes to prevent false signal arising from the conductivity among the electrodes. However, if the refractive index of the sensing electrodes is different from the insulators or the supporting substrate, the visual effects of the screen behind the touch panel will be affected and the light transmission of touch panel will also be reduced. Therefore, a special structure and manufacturing method to reduce the visual difference and improve the visual effects of touch panel is required.

SUMMARY OF THE INVENTION

A touch panel stackup comprises a substrate, a first conductive element having a first refractive index and forming a plurality of patterns. The plurality of first patterns having a geocode for sensing tactile signals in a first direction and in a second direction. The plurality of first patterns having one or more gaps among them, a second conductive element electrically coupled with the plurality of patterns and an insulator in one or more gaps having a second refractive index substantially identical with the first refractive index.

DETAILED DESCRIPTION

Figure 1:
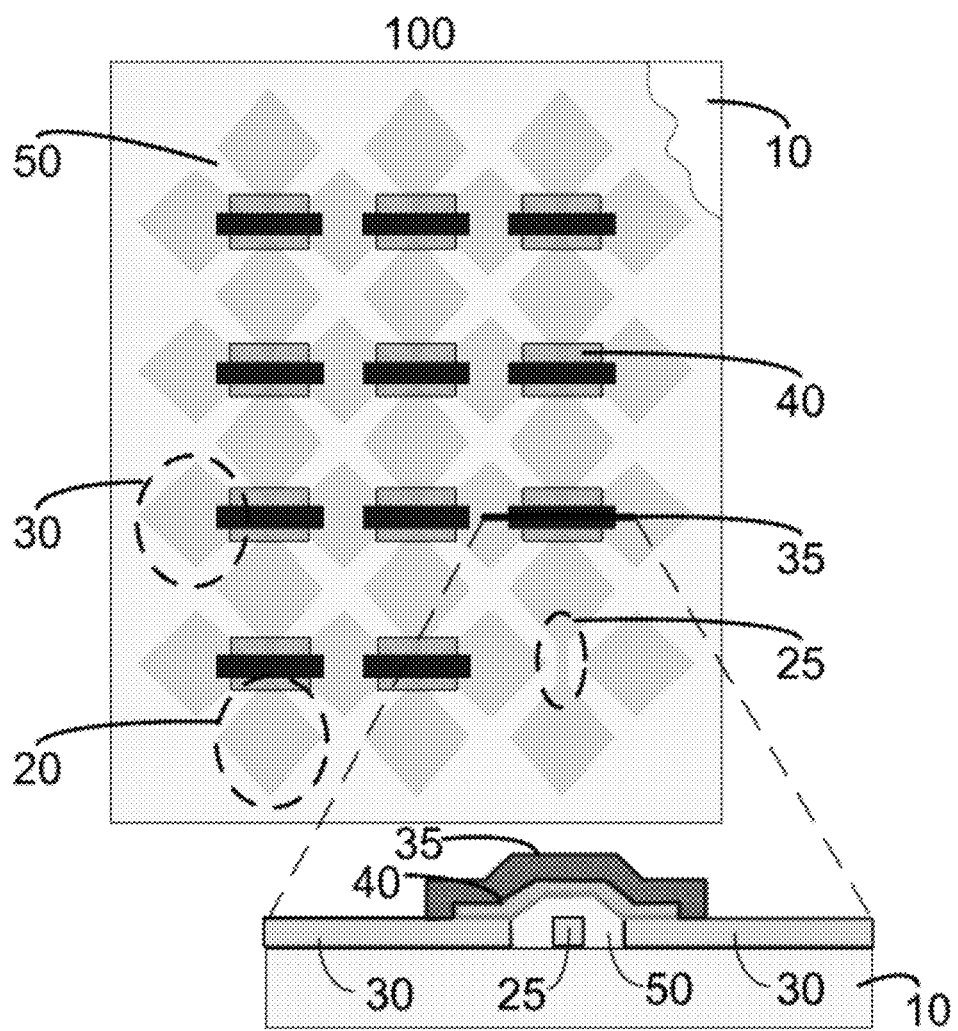
FIG. 1 is the top view and cross-section view of the first embodiment of the touch panel stackup.

FIG. 1 shows the first embodiment of the present invention. Touch panel stackup 100 comprises a substrate 10. Substrate 10 contains several transparent electrode patterns 20 for sensing the tactile movements of the first direction. The electrode patterns 20 can be round-shaped, oval, polygon or irregular patterns and so on. The materials of the electrode patterns 20 can be Indium Tin Oxide, Aluminum Zinc Oxide, Zinc Tin Oxide or other substantially transparent conductive material, such as conductive glass, Conductive Polymer, Carbon Nanotube, and etc. Electrode patterns 20 are electrically coupled by electrical wires 25. In FIG. 1, the Insulator 40 is placed between matching material 50 and electrical wires 35 to show the position of electrical wires 25. The material of electrical wires 25 can be the above-mentioned transparent conductive material, or the opaque conductive material with appropriate size such as aluminum, silver, copper and other metal materials. If non-transparent conductive material is used, the size of electrical wires 25 should be adjusted such that users viewing the rear screen would have better visual experience. Substrate 10 also comprises several transparent electrode patterns 30 for sensing tactile movements of the second direction. Electrode patterns 30 are electrically coupled by electrical wires 35. The material of electrical wires 35 can be transparent conductive material or opaque conductive material with appropriate size. If opaque conductive material is used, the size of electrical wires 35 should be adjusted to ensure that users have better visual experience. Insulator 40 is placed between electrical wires 25 and electrical wires 35 to ensure false signal will not be produced due to conductivity. Refractive index matching material 50 is placed among electrode patterns 20, 30 and electrical wires 25, 35. Refractive index matching material 50 is insulator or material with sufficient resistance such that false signals will not be produced by the conductivity among different electrode patterns and electrical wires. Electrode patterns 20, 30 and electrical wires 25, 35 can be made by methods of sputter, photolithography, printing, or laser ablation and can be made of materials with the same or approximate refractive index. Further, appropriate refractive index matching material 50 is used to reduce the visual differences between areas with electrode patterns and areas without electrode patterns. To simplify the manufacturing process, the same materials of insulator 40 can be used for refractive index matching material 50. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 which is placed among electrode patterns 20, 30 and electrical wires 25, 35 could be 1.5~2.1, such as, TiO$_2$: 1.7~1.8, SiO$_2$: 1.5~1.6, Nb$_2$O$_5$: 2.0~2.1, and transparent insulating photoresist: 1.5~1.6.

Figure 2:
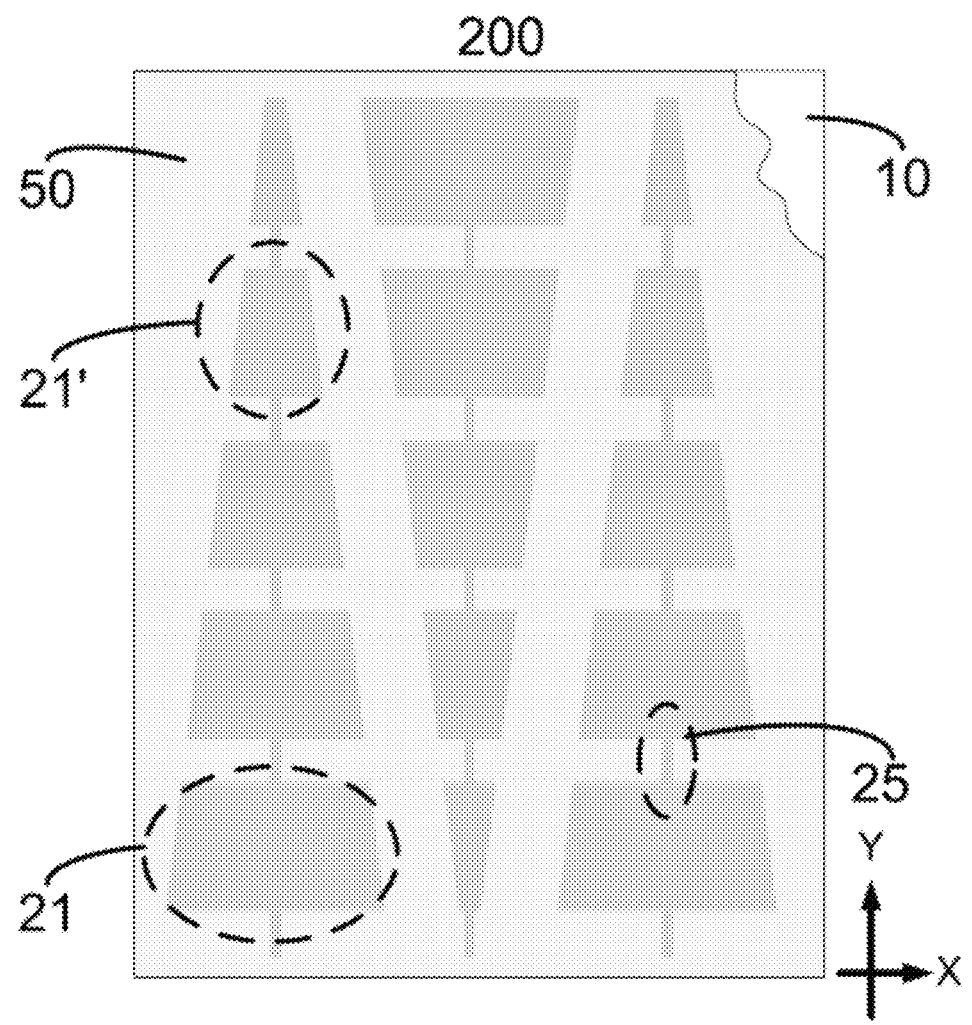
FIG. 2 is the top view of the second embodiment of the touch panel stackup.

FIG. 2 is the second embodiment of the present invention. Different sizes of the electrode patterns are used in this embodiment. If the size of electrode patterns is the same, then different geocodes will be used. Touch panel stackup 200 comprises substrate 10 with several transparent electrode patterns 21. The shape of electrodes patterns 21 can be round, oval, polygonal, or irregular. The electrodes patterns 21 can be made of above-mentioned substantially transparent conductive material or other appropriate material. Electrode patterns 21 are electrically coupled by electrical wires 25. Electrical wires 25 can be made of above-mentioned transparent conductive material or opaque conductive material with appropriate size such as aluminum, silver, cooper, etc. If opaque conductive material is used, the size of electrical wires 25 should be adjusted to provide users with better visual experience. In FIG. 2, electrode patterns 21 form three groups using electrical wires 25. Each of the three groups corresponds to a different X coordinate on the touch panel. Further, different sizes of electrode patterns 21 are used such that different capacitance changes will be produced when users touch different electrode patterns, which allow us to determine Y coordinates. For instance, when users touch electrode patterns 21', the touch will be sensed by the left group of electrode patterns in FIG. 2 and X coordinates of the touch will be located. Y coordinates of the touch can be located by the different capacitance changes. This embodiment can sense tactile signals in the first and the second direction. Further, each electrode pattern 21 can be of the same size or with appropriate geocode such that electrode patterns 21 can sense tactile signals in the first direction and the second direction at the same time. In all the embodiments, electrode patterns 21 and electrode patterns 30 can also make use of the appropriate geocode sensing mechanism. Refractive index matching material 50 is placed between electrode patterns 21 and electrical wires 25. Refractive index matching material 50 is an insulator or a material with sufficient resistance such that false signals will not be produced due to the conductivity between electrode patterns and electrical wires. Electrode patterns 21 and electric wires 25 are made by methods of sputter, photolithography, printing, or laser ablation and are made of materials with the same or approximate refractive index. Further, appropriate refractive index matching material 50 is used to reduce the visual differences between areas with electrode patterns and areas without electrode patterns.

Figure 3:
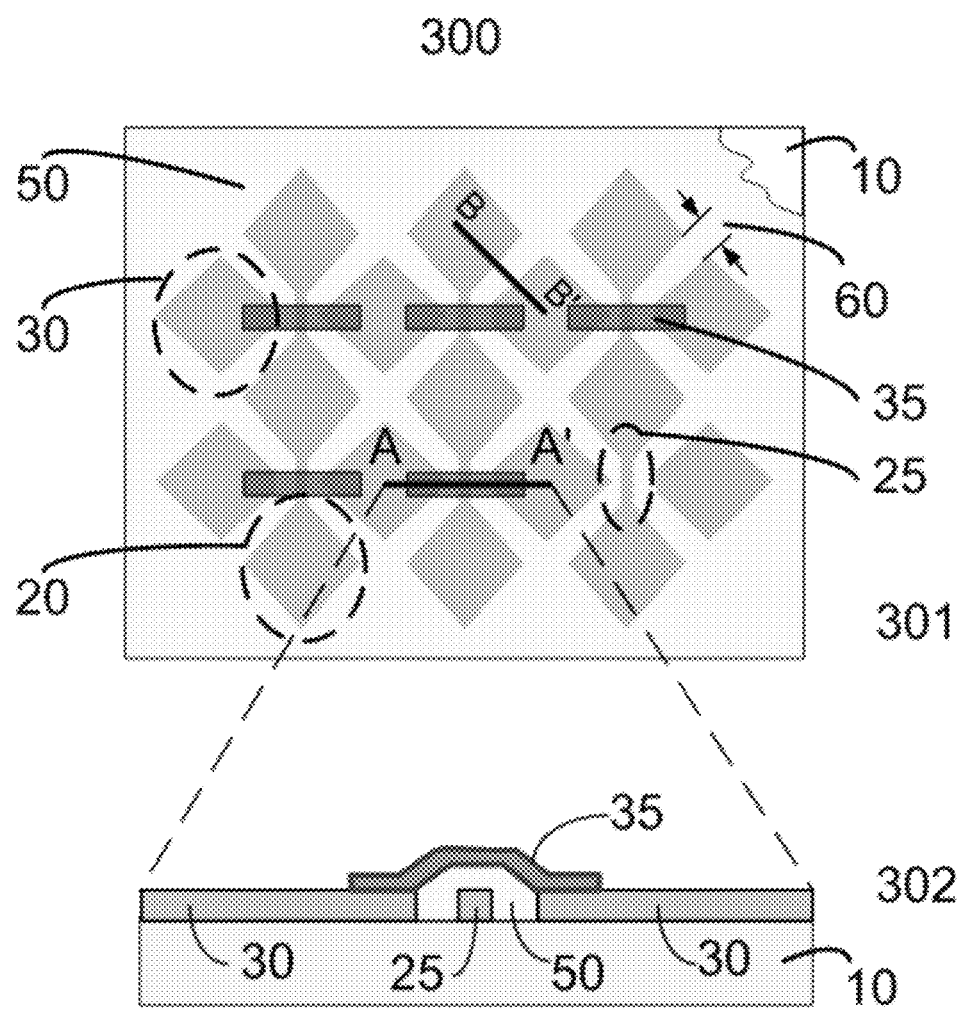
FIG. 3 is the top view and cross-section view of the third embodiment of the touch panel stackup.

FIG. 3 is the third embodiment of the present invention. FIG. 301 is the top view of touch panel stackup 300 and FIG. 302 is the cross-section view along A-A'. Several transparent electrode patterns 20 on substrate 10 are electrically coupled by electrical wires 25. In order to show the position of electrical wires 25, electrical wires 35 on the bottom right portion of FIG. 3 are not shown. Refractive index matching material 50 is placed among electrode patterns 20, electrical wires 25 and electrode patterns 30. Refractive index matching material 50 is an insulator or a material with sufficient resistance such that false signals will not be produced by the conductivity among different electrode patterns and electrical wires. Several transparent electrode patterns 30 are electrically coupled by electrical wires 35. Electrical wires 35 can be placed above the refractive index matching material 50 and across electrical wires 25 such that electrical wires 35 are insulated from electrical wires 25 to prevent false signal due to the conductivity. The refractive index matching material 50 can fully fill in the gaps 60 and does not overlap with electrode patterns 20 and electrode patterns 30. The material of electrical wires 35 can be transparent conductive material with the same or approximate refractive index as electrode patterns 20, 30 or opaque conductive material with appropriate size. If opaque conductive material is used, the size of electrical wires 35 should be adjusted to ensure that users have better visual experience. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 that is placed among electrode patterns 20, 30 and electrical wires 25, 35 could be 1.5~2.1, for example, TiO$_2$: 1.7~1.8, SiO$_2$: 1.5~1.6, Nb$_2$O$_5$: 2.0~2.1, and transparent insulating photoresist: 1.5~1.6.

In this embodiment, the manufacturing method of refractive index matching material 50 is chosen according to the size of the gaps 60 between electrode patterns 20 and electrode patterns 30 such that the refractive index matching material 50 can fully fill in the gaps 60 and does not overlap with electrode patterns 20 and electrode patterns 30. For instance, if the size of the gaps 60 is 100 microns or more, screen printing is the proper manufacturing method. If the size of the gaps 60 is tens of microns, Inkjet printing is the proper manufacturing method. If the size of the gaps 60 is less than 10 microns, aerosol printing or photolithography is the proper manufacturing method.

Figure 4:
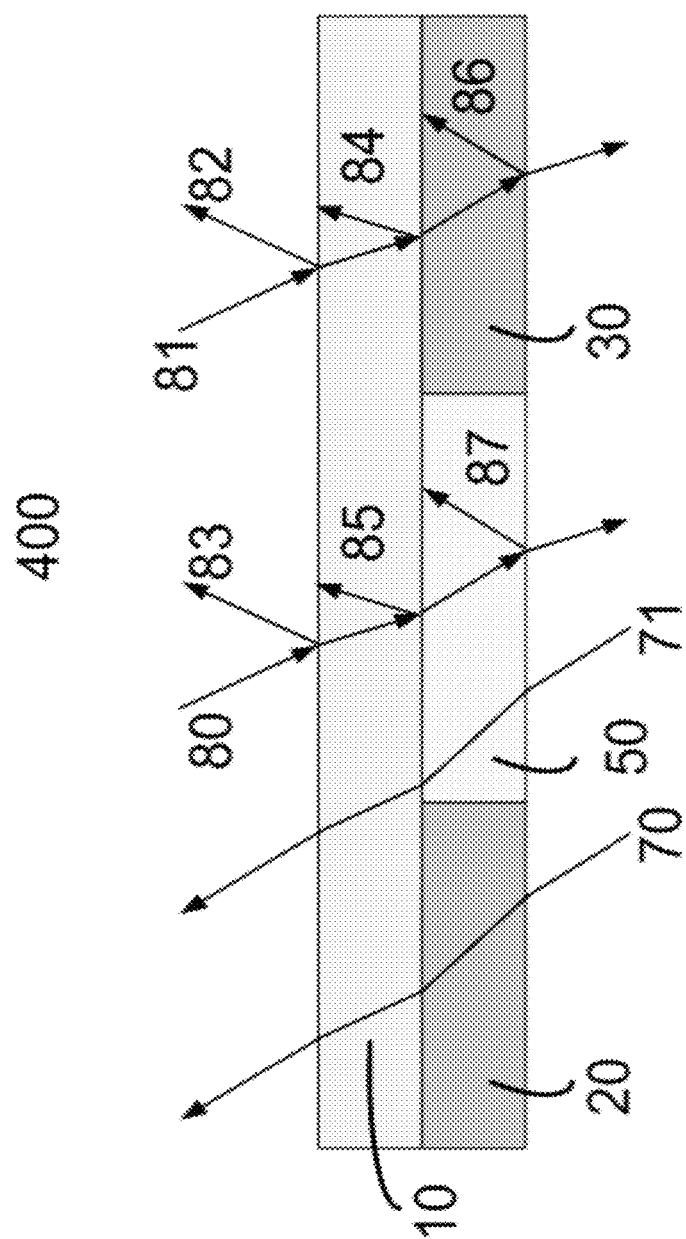
FIG. 4 is another cross-section view of the third embodiment of the touch panel stackup.

FIG. 4 is the cross-section view along B-B' of the touch panel stackup 300 in FIG. 3. FIG. 4 shows the relative positions of substrate 10, transparent electrode patterns 20, 30 and refractive index matching material 50 in touch panel stackup 400. In this embodiment, by choosing refractive index matching material 50 with approximate refractive index to electrode patterns 20, 30, we make the refraction and transmission of the touch panel stackup 400 approximately the same. The refractive index matching material 50 can fully fill in the gaps 60 and does not overlap with electrode patterns 20 and electrode patterns 30. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 could be 1.5~2.1, for example, TiO$_2$: 1.7~1.8, SiO$_2$: 1.5~1.6, Nb$_2$O$_5$: 2.0~2.1 and transparent insulating photoresist: 1.5~1.6. As shown in FIG. 4, when the light 80, 81 enters into touch panel stackup 400, reflective light 82, 83 is produced on air interface and substrate 10 respectively, reflective light 84 is produced on substrate 10 and electrode patterns 30, reflective light 85 is produced on substrate 10 and refractive index matching material 50, and reflective light 86, 87 is produced on electrode patterns 30 or refractive index matching material 50 and lower part interface respectively. Because electrode patterns 30 have an refractive index similar to refractive index matching material 50, users would not sense any difference when observing reflective light 82, 83, 84, 85, 86, 87. By choosing appropriate electrode patterns 20, 30 and refractive index matching material 50, we make every layer of touch panel stackup 400 in a refractive index matching state such that users would have better visual experience.

Figure 5:
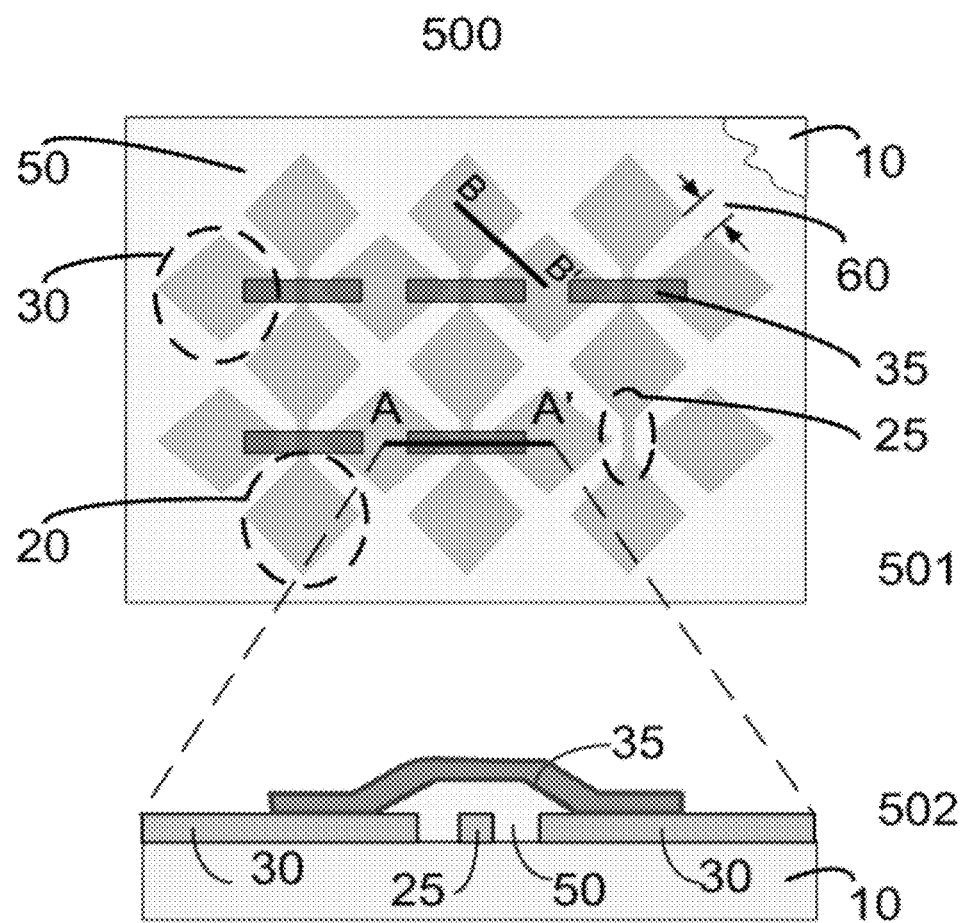
FIG. 5 is the top view and cross-section view of the fourth embodiment of the touch panel stackup.

FIG. 5 is the touch panel stackup 500 of the fourth embodiment. FIG. 501 is the top view of touch panel stackup 500 and FIG. 502 is the cross-section view along A-A'. Several transparent electrode patterns 20 on substrate 10 are electrically coupled by electrical wires 25. In order to show the position of electrical wires 25, electrical wires 35 located at the bottom right portion of FIG. 5 are not shown. Refractive index matching material 50 is placed among electrode patterns 20, electrical wires 25 and electrode patterns 30. Refractive index matching material 50 is an insulator or a material with sufficient resistance such that false signals will not be produced by the conductivity among different electrode patterns and electrical wires. Several transparent electrode patterns 30 are electrically coupled by electrical wires 35. Electrical wires 35 can be placed above the refractive index matching material 50 and across electrical wires 25 such that electrical wires 35 are insulated from electrical wires 25 to prevent false signal due to the conductivity. The refractive index matching material 50 can fully fill in the gaps 60 or the refractive index matching material 50 may also partially overlap with electrode patterns 20 or electrode patterns 30. The material of electrical wires 35 can be transparent conductive material with the same or approximate refractive index as electrode patterns 20, 30 or opaque conductive material with appropriate size. If opaque conductive material is used, the size of electrical wires 35 should be adjusted to ensure that users have better visual experience. In this embodiment, the appropriate manufacturing method of refractive index matching material 50 is chosen from screen printing, Inkjet printing, aerosol printing or photolithography according to the size of the gaps 60 between electrode patterns 20 and electrode patterns 30 such that the refractive index matching material 50 can fully fill in the gaps 60. Alternatively, the refractive index matching material 50 may also partially overlap with electrode patterns 20 or electrode patterns 30. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 which is placed among electrode patterns 20, 30 and electrical wires 25, 35 could be 1.5~2.1, for example, $TiO_2$: 1.7~1.8, $SiO_2$: 1.5~1.6, $Nb_2O_5$: 2.0~2.1 and transparent insulating photoresist: 1.5~1.6.

Figure 6:
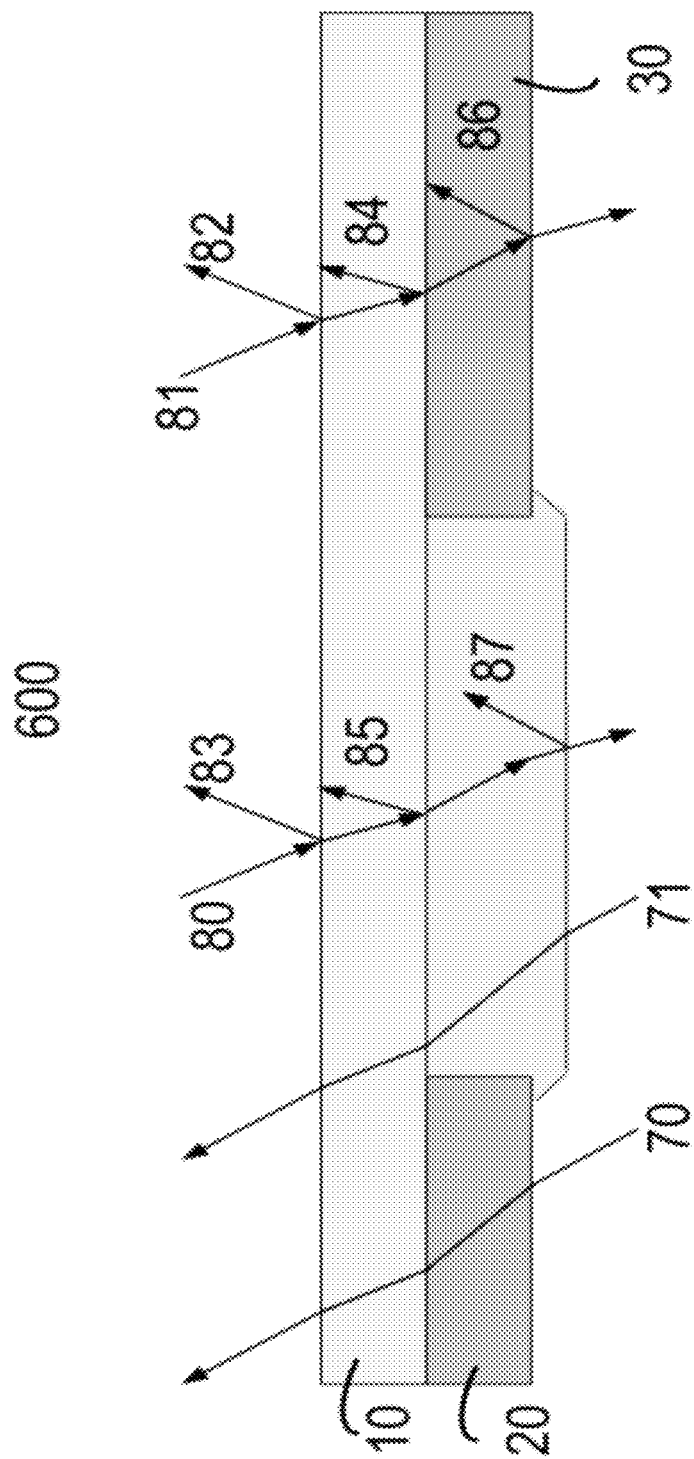
FIG. 6 is another cross-section view of the fourth embodiment of the touch panel stackup.

FIG. 6 is the cross-section view along B-B' of the touch panel stackup 500 in FIG. 5. FIG. 6 shows the relative positions of substrate 10, transparent electrode patterns 20, 30 and refractive index matching material 50 in touch panel stackup 600. In this embodiment, by choosing refractive index matching material 50 with approximate refractive index to electrode patterns 20, 30, we make the refraction and transmission of the touch panel stackup 600 approximately the same. The refractive index matching material 50 can fully fill in the gaps 60 or the refractive index matching material 50 may also partially overlap with electrode patterns 20 or electrode patterns 30. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 could be 1.5~2.1, for example, $TiO_2$: 1.7~1.8, $SiO_2$: 1.5~1.6, $Nb_2O_5$: 2.0~2.1, and transparent insulating photoresist: 1.5~1.6. As shown in FIG. 6, when the light 80, 81 enters into touch panel stackup 600, reflective light 82, 83 is produced on air interface and substrate 10 respectively, reflective light 84 is produced on substrate 10 and electrode patterns 30, reflective light 85 is produced on substrate 10 and refractive index matching material 50, and reflective light 86, 87 is produced on electrode patterns 30 or refractive index matching material 50 and lower part interface respectively. Because electrode patterns 20 have an refractive index similar to refractive index matching material 50, users would not sense any difference when observing reflective light 82, 83, 84, 85, 86, 87. By choosing refractive index matching material 50 with approximate refractive index to electrode patterns 20, 30, we make every layer of touch panel stackup 600 in a refractive index matching state such that users would have better visual experience.

Figure 7:
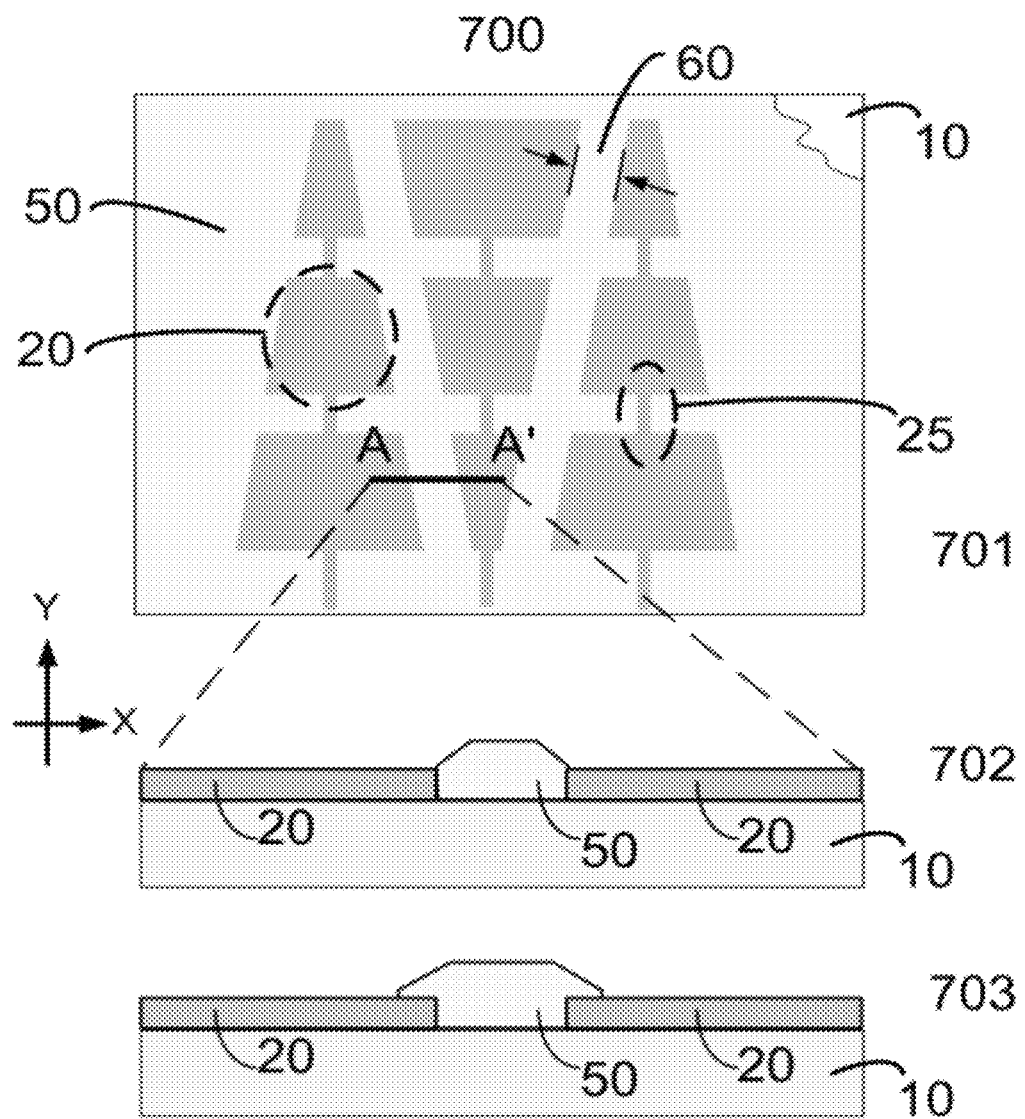
FIG. 7 is the top view and cross-section view of the fifth embodiment of the touch panel stackup.

FIG. 7 is the touch panel stackup 700 of the fifth embodiment. Different sizes of the electrode patterns are used in this embodiment, if the size of electrode patterns is the same, then different geocodes will be used. FIG. 701 is the top view of touch panel stackup 700, FIG. 702 is the cross-section view of touch panel stackup 700 along A-A', and FIG. 703 is another cross-section view of touch panel stackup 700. Several transparent electrode patterns 20 on substrate 10 are electrically coupled by electrical wires 25. Refractive index matching material 50 is placed among electrode patterns 20 and electrical wires 25. Refractive index matching material 50 is an insulator or a material with sufficient resistance such that false signals will not be produced by the conductivity among different electrode patterns and electrical wires. The refractive index matching material 50 can fully fill in the gaps 60 or the refractive index matching material 50 may also partially overlap with electrode patterns 20 or electrode patterns 30. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 could be 1.5~2.1, for example, $TiO_2$: 1.7~1.8, $SiO_2$: 1.5~1.6, $Nb_2O_5$: 2.0~2.1, and transparent insulating photoresist: 1.5~1.6. In FIG. 7, electrode patterns 20 form three groups by electrical wires 25, each corresponding to different X coordinates on the touch panel. Further, different sizes of electrode patterns 20 are used such that different capacitance changes will be produced when users touch different electrode patterns, which allow us to locate Y coordinates. Further, each electrode pattern 20 can be of the same size or with appropriate geocode such that electrode patterns 20 can sense tactile signals in the first direction and the second direction at the same time. In this embodiment, the manufacturing method of refractive index matching material 50 such as screen printing, Inkjet printing, aerosol printing or photolithography, is chosen according to the size of the gaps 60 among electrode patterns 20. As shown in FIG. 702, the gaps 60 among electrode patterns 20 are fully filled by refractive index matching material 50. Further, as shown in FIG. 703, the refractive index matching material 50 may also partially overlap with electrode patterns 20. In FIG. 702 and FIG. 703, the path of light is similar to FIG. 4 and FIG. 6. Because we can adjust the refractive index of each layer of touch panel stackup 700, users would have better visual experience.

Figure 8:
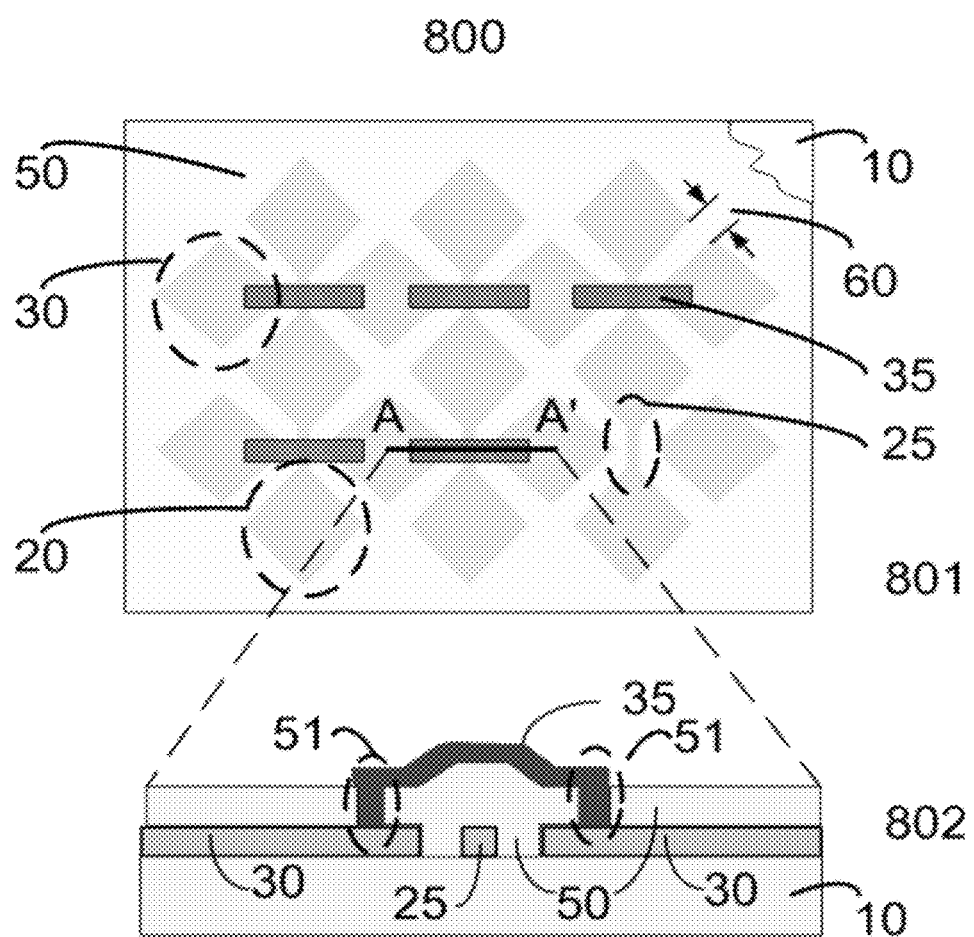
FIG. 8 is the top view and cross-section view of the sixth embodiment of the touch panel stackup.

FIG. 8 is the touch panel stackup 800 of the sixth embodiment. FIG. 801 is the top view of touch panel stackup 800 and FIG. 802 is the cross-section view along A-A'. Several transparent electrode patterns 20 on substrate 10 are electrically coupled by electrical wires 25. In order to show the position of electrical wires 25, electrical wires 35 located at the bottom right portion of FIG. 8 are not shown. Refractive index matching material 50 is placed among electrode patterns 20, electrical wires 25 and electrode patterns 30. Refractive index matching material 50 is an insulator or a material with sufficient resistance such that false signals will not be produced by the conductivity among different electrode patterns and electrical wires. Transparent electrode patterns 30 are electrically coupled with electrical wires 35 by the upper opening 51 of refractive index matching material 50. Electrical wires 35 can be placed above the refractive index matching material 50 such that electrical wires 35 are insulated from electrical wires 25 to prevent false signal due to the conductivity. The material of electrical wires 35 can be transparent conductive material with the same or approximate refractive index as electrode patterns 20, 30 or opaque conductive material with appropriate size. If opaque conductive material is used, the size of electrical wires 35 should be adjusted to ensure that users have better visual experience. The material of substrate 10 can be glass, and the refractive index of glass could be 1.4~1.9. Substrate 10 contains several transparent electrode patterns 20, 30. The materials of electrode patterns could be Indium Tin Oxide with a refractive index of 1.7~1.8. The refractive index of refractive index matching material 50 which is placed among electrode patterns 20, 30 and electrical wires 25, 35 could be 1.5~2.1, for example, $TiO_2$: 1.7~1.8, $SiO_2$: 1.5~1.6, $Nb_2O_5$: 2.0~2.1 and transparent insulating photoresist: 1.5~1.6.

In this embodiment, the appropriate manufacturing method of refractive index matching material 50 is chosen from screen printing, Inkjet printing, aerosol printing or photolithography according to the size of the gaps 60 between electrode patterns 20 and electrode patterns 30. The refractive index matching material 50 fully fills in the gaps of electrode patterns 20 and electrode patterns 30. Further, the refractive index matching material 50 will be placed above electrode patterns 20 or electrode patterns 30. In FIG. 802, the path of light is similar to FIG. 600. Because we can adjust the refractive index of each layer of touch panel stackup 700, users would have better visual experience.

Figure 9:
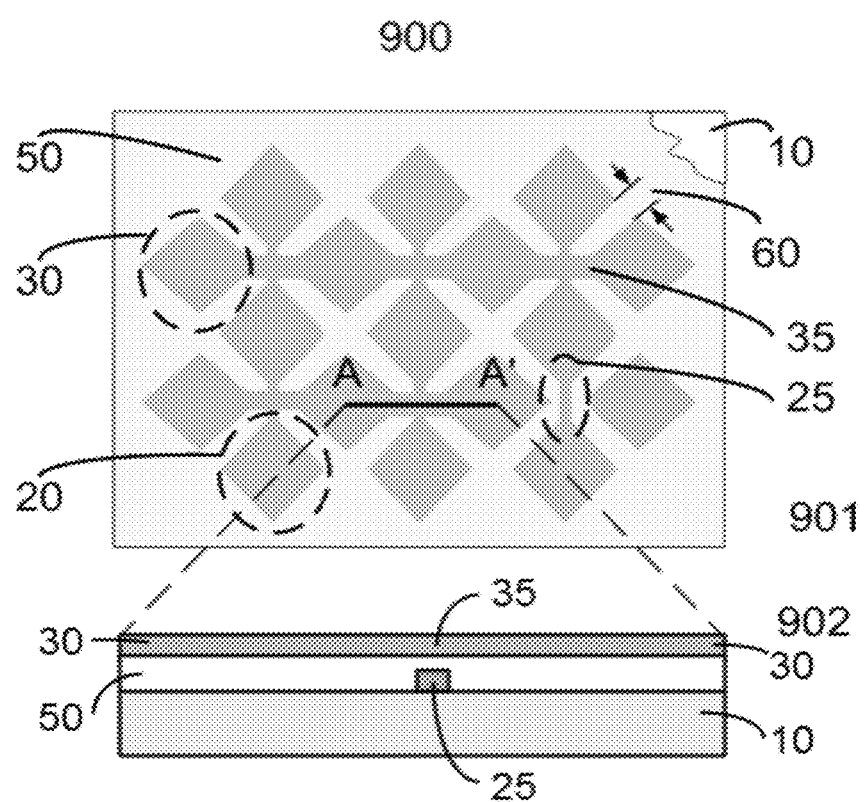
FIG. 9 is the top view and cross-section view of the seventh embodiment of the touch panel stackup.

FIG. 9 is the touch panel stackup 900 of the seventh embodiment. FIG. 901 is the top view of touch panel stackup 900, FIG. 902 is the cross-section view along A-A' and FIG. 903 is the cross-section view. Several transparent electrode patterns 20 on substrate 10 are electrically coupled by electrical wires 25. In order to show the position of electrical wires 25, electrical wires 35 located at the bottom right portion of FIG. 9 are not shown. Refractive index matching material 50 is placed among electrode patterns 20, electrical wires 25 and electrode patterns 30. Refractive index matching material 50 is an insulator or a material with sufficient resistance such that false signals will not be produced by the conductivity among different electrode patterns and electrical wires. The electrode patterns 20 and electrode patterns 30 are on different planes, and refractive index matching material 50 is placed therein between the different planes. Several transparent electrode patterns 30 are electrically coupled by electrical wires 35. Electrical wires 25 are insulated from electrical wires 35 by refractive index matching material 50 to prevent false signal due to the conductivity. The material of electrical wires 35 can be transparent conductive material with the same or approximate refractive index as electrode patterns 20, 30 or opaque conductive material with appropriate size. If opaque conductive material is used, the size of electrical wires 35 should be adjusted to ensure that users have better visual experience. Further, we could first place electrode patterns 20 on substrate 10 and then electrically couple electrode patterns 20 by electrical wires 25. Second, place refractive index matching material 50 on electrical wires 25 or in whole substrate 10. Third, on the upper part, install electrode patterns 30 and electrical wires 35 by using the same material. Although not shown in FIG. 9, the electrode patterns 20 and electrode patterns 30 are on different planes, and refractive index matching material is placed therein between the different planes. Appropriate manufacturing method of refractive index matching material 50 is chosen from screen printing, Inkjet printing, aerosol printing or photolithography according to the size of the gaps 60 between electrode patterns 20 and electrode patterns 30. As shown in FIG. 902, the gaps 60 among electrode patterns 20 are fully filled by refractive index matching material 50. Further, as shown in FIG. 903, the refractive index matching material 50 may also partially overlap with electrode patterns 20. In FIG. 902 and FIG. 903, the path of light is similar to FIG. 400 and FIG. 600. Because we can adjust the refractive index of each layer of touch panel stackup 900, users would have better visual experience.

In one example, the manufacturing method of this invention involves the following steps: Step 1: we first place pre-determined electrode patterns made of transparent conductive material on the substrate by methods of sputter, photolithography, printing, or laser ablation. Then, we connect electrode patterns by conductive material such that electrode patterns could sense tactile signals in the first direction. Step 2: we fully fill in all the gaps among electrode patterns with refractive index matching material by methods of screen printing, Inkjet printing, aerosol printing or photolithography. If necessary, the refractive index matching material could partially overlap with electrode patterns. The refractive index matching material could be made by methods of baking, curing or etching. Step 3: we connect transparent conductive material or opaque conductive material having appropriate sizes with electrode patterns by screen printing, Inkjet printing, aerosol printing or photolithography, to sense tactile signal in the second direction. The electrode patterns for sensing the tactile signal in the second direction can be made in step 1 and be connected in step 3, or be made and be connected both in step 3. If necessary for the making of conductive material, the methods of baking, curing and etching can be used. If in step 1, different sizes of electrode patterns were used to produce geocoded electrode patterns which could sense tactile signal in the first direction and in the second direction at the same time, step 3 can be eliminated. The sequence of all above-mentioned steps can be adjusted to meet the actual needs.

In another example, the manufacturing method of the invention includes: forming a substrate; forming a first electrical wire; forming an insulator; forming a second electrical wire, wherein the insulator is positioned between the first electrical wire and second electrical wire to insulate the first electrical wire from the second electrical wire; forming on the substrate a first electrode having a first refractive index and having a plurality of first patterns for sensing tactile signals in a first direction, wherein the plurality of first patterns is electrically coupled with the first electrical wire; and forming on the substrate a second electrode having a second refractive index and having a plurality of second patterns for sensing tactile signals in a second direction, wherein the plurality of second patterns is electrically coupled with the second electrical wire, and wherein the insulator has a third refractive index substantially identical to the first and second refractive index. As described above, electrode patterns can be made of transparent conductive material and can be formed on the substrate through a number of different methods, such as sputter, photolithography, printing, and/or laser ablation. The insulator can be formed by screen printing, inkjet printing, aerosol printing, photolithography, baking, curing, and/or etching.

In yet another example, the manufacturing method of the invention includes: forming a substrate; forming electrical wires for electrically coupling electrode patterns; forming an insulator layer having a plurality of gaps that allow the electrical wires to electrically couple with electrode patterns through the plurality of gaps, and wherein the insulator layer has a first refractive index; forming a first electrode having a second refractive index and having a plurality of first patterns on the insulator layer; and forming a second electrode having a third refractive index and having a plurality of second patterns on the insulator, wherein the plurality of second patterns is electrically coupled with the electrical wires accessible through the plurality of gaps in the insulator layer, and wherein the first refractive index, the second refractive index, and the third refractive index are substantially similar.

In still another example, the manufacturing method of the invention includes: forming a substrate; forming first electrical wires; forming insulator regions on the first electrical wires, and wherein the insulator regions have a first refractive index; forming a first electrode having a second refractive index and having a plurality of first patterns on the substrate, and wherein the plurality of first patterns are electrically coupled by the first electrical wires; forming a second electrode having a third refractive index and having a plurality of second patterns on the substrate; and forming second electrical wires for electrically coupling the plurality of second patterns, and wherein the second electrical wires are shielded by the insulator regions from electrical contact with the first electrical wires, and wherein the first refractive index, the second refractive index, and the third refractive index are substantially similar.

According to the design of the products, different electrode patterns, electrical wires and refractive index matching material are chosen. The material of substrate can be glass, and the refractive index of glass could be 1.4~1.9. The materials of electrode patterns could be Indium Tin Oxide with a refractive index of 1.7~1.8. The refractive index of refractive index matching material which is placed among electrode patterns and electrical wires could be 1.5~2.1, for example, $TiO_2$: 1.7~1.8, $SiO_2$: 1.5~1.6, $Nb_2O_5$: 2.0~2.1 and transparent insulating photoresist: 1.5~1.6. Some products would have areas with specific function on the touch panel and would require some pre-determined patterns to describe such specific function areas. We could adopt several different groups of electrode patterns, electrical wires, and refractive index matching material with different colors or different refractive index to form different refractive index matching areas on the touch panel and to form desired patterns.

This invention has been described with reference to embodiments. It shall be understood, however, that many alternative modifications and variations will be apparent to those having ordinary skill in the pertinent art in light of the foregoing description. Accordingly, the present invention embraces all such alternative modifications and variations as fall within the spirit and scope of the appended claims.

What is claimed is:

1. A touch panel stackup, comprising:
    a substrate;
    a first electrode having a first refractive index and forming a plurality of first patterns on the substrate for sensing tactile signals in a first direction;
    a second electrode having a second refractive index and forming a plurality of second patterns on the substrate for sensing tactile signals in a second direction;
    a first electrical wire electrically coupling a pair of adjacent first patterns of the plurality of first patterns;
    a second electrical wire electrically coupling a pair of adjacent second patterns of the plurality of second patterns; and
    an insulator disposed between the first electrical wire and the second electrical wire to insulate the first electrical wire from the second electrical wire, wherein:
        the insulator has a third refractive index substantially identical to the first refractive index and the second refractive index,
        the plurality of first patterns and the plurality of second patterns are formed on a same layer,
        the third refractive index is 1.9~2.1,
        the insulator has a first sidewall overlying a gap defined between the first electrical wire and a first pattern of the pair of adjacent second patterns,
        the first sidewall is sloped at an angle other than ninety degrees relative to a top surface of the substrate,
        the first sidewall of the insulator abuts a planar top surface of the insulator that overlies the first pattern of the pair of adjacent second patterns, and
        the second electrical wire overlies the first sidewall of the insulator,
        the second electrical wire has a first planar top surface abutting the planar top surface of the insulator and a second sidewall of the second electrical wire having a non-90 degree slope relative to the top surface of the substrate, and the first planar top surface of the second electrical wire is spaced apart from the first pattern of the pair of adjacent second patterns by the insulator, and wherein the second sidewall of the second electrical wire abuts the first sidewall of the insulator.

2. The touch panel stackup of claim 1, wherein the first refractive index is identical to the second refractive index.

3. The touch panel stackup of claim 1, wherein a refractive index of the first electrical wire is identical to a refractive index of the second electrical wire.

4. The touch panel stackup of claim 1, wherein the first electrical wire and the second electrical wire are opaque.

5. The touch panel stackup of claim 1, wherein the first electrical wire and the second electrical wire are transparent.

6. The touch panel stackup of claim 1, wherein the insulator is substantially transparent.

7. The touch panel stackup of claim 1, wherein the first electrode and the second electrode are substantially transparent.

8. The touch panel stackup of claim 1, wherein a material of the insulator is chosen from $TiO_2$, $SiO_2$, $Nb_2O_5$ or transparent insulating photoresist.

9. The touch panel stackup of claim 1, wherein a refractive index of the substrate is 1.4~1.9.

10. The touch panel stackup of claim 1, wherein the second electrical wire has a second planar top surface abutting the second sidewall of the second electrical wire and overlying the first electrical wire.

11. The touch panel stackup of claim 1, wherein the second electrical wire has a sidewall abutting the planar top surface, and the sidewall is sloped at an angle of ninety degrees relative to the top surface of the substrate.

12. A touch panel stackup, comprising:
    a substrate;
    a first conductive element having a first refractive index and forming a plurality of patterns arranged to define one or more gaps on the substrate, wherein the first conductive element defines a sensing area for sensing a tactile movement;

an insulator disposed within the one or more gaps, wherein the insulator has a second refractive index substantially identical to the first refractive index; and a second conductive element electrically coupled with the first conductive element through a plurality of openings defined by the insulator, wherein:

the second conductive element is disposed in the sensing area, the second conductive element has a first sidewall overlying the insulator and overlying a first gap of the one or more gaps, the first sidewall is sloped at an angle other than ninety degrees relative to a top surface of the substrate, and the second conductive element has a planar top surface abutting the first sidewall of the second conductive element and overlying a first pattern of the plurality of patterns wherein the planar top surface of the second conductive element is spaced apart from the first pattern of the plurality of patterns by the insulator.

13. The touch panel stackup of claim 12, wherein the first conductive element and the second conductive element are of a same material.

14. The touch panel stackup of claim 12, wherein the first conductive element and the insulator are transparent.

15. The touch panel stackup of claim 12, wherein the second conductive element is opaque.

16. The touch panel stackup of claim 12, wherein a material of the insulator is chosen from $TiO_2$, $SiO_2$, $Nb_2O_5$ or transparent insulating photoresist.

17. The touch panel stackup of claim 12, wherein a material of the first conductive element is chosen from Indium Tin Oxide, Aluminum Zinc Oxide, Zinc Tin Oxide, Conductive Polymer or Carbon Nanotube.

18. The touch panel stackup of claim 12, wherein a material of the second conductive element is chosen from aluminum, silver or copper.

19. The touch panel stackup of claim 12, wherein a refractive index of the substrate is 1.4~1.9.

20. The touch panel stackup of claim 12, wherein the second refractive index is 1.5~2.1.

21. The touch panel stackup of claim 12, wherein the second conductive element has a second sidewall abutting the planar top surface of the second conductive element, and the second sidewall is sloped at an angle of ninety degrees relative to the top surface of the substrate.

22. The touch panel stackup of claim 12, wherein the second conductive element has a second planar top surface abutting the first sidewall of the second conductive element and disposed diametrically opposite the planar top surface of the second conductive element relative to the first sidewall.

* * * * *